(12) United States Patent
Loce et al.

(10) Patent No.: US 7,079,289 B2
(45) Date of Patent: Jul. 18, 2006

(54) RANK-ORDER ERROR DIFFUSION IMAGE PROCESSING

(75) Inventors: Robert P. Loce, Webster, NY (US); Michael Branciforte, Rochester, NY (US); Beilei Xu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1047 days.

(21) Appl. No.: 09/968,651

(22) Filed: Oct. 1, 2001

(65) Prior Publication Data

US 2003/0090729 A1    May 15, 2003

(51) Int. Cl.
  *H04N 1/40*    (2006.01)
(52) U.S. Cl. ............... 358/3.03; 358/3.06; 382/237
(58) Field of Classification Search ........... 358/1.9, 358/3.16, 3.03–3.06, 3.13–3.14; 382/237
  See application file for complete search history.

(56) References Cited

U.S. PATENT DOCUMENTS

| | | | |
|---|---|---|---|
| 4,210,936 A | 7/1980 | Cinque et al. | |
| 4,680,645 A | 7/1987 | Dispoto et al. | |
| 4,843,468 A | 6/1989 | Drewery | |
| 5,050,000 A | 9/1991 | Ng | |
| 5,051,841 A | 9/1991 | Bowers et al. | |
| 5,077,615 A | 12/1991 | Tsuji | |
| 5,535,019 A | 7/1996 | Eschbach | |
| 5,581,371 A | 12/1996 | Spaulding et al. | |
| 5,602,943 A | 2/1997 | Velho et al. | |
| 5,604,605 A | 2/1997 | Moolenaar | |
| 5,940,541 A | 8/1999 | Donelly | |
| 5,991,438 A | 11/1999 | Shaked et al. | |
| 6,160,921 A | 12/2000 | Marcu | |

FOREIGN PATENT DOCUMENTS

| | | |
|---|---|---|
| EP | 0 356 225 A2 | 2/1990 |
| EP | 0 474 985 A2 | 3/1992 |
| EP | 0 667 704 A2 | 8/1995 |
| EP | 0 837 598 A1 | 4/1998 |

*Primary Examiner*—Thomas D. Lee
*Assistant Examiner*—Stephen Brinich
(74) *Attorney, Agent, or Firm*—Fay, Sharpe, Fagan, Minnich & McKee, LLP

(57) ABSTRACT

Error is distributed to pixels neighboring a pixel of interest based on a ranking of the neighboring pixels. The ranking is based on pixel values of the neighboring pixels. Optionally a spatial weighting is applied to the pixel values before ranking, to provide a preference for pixels closest to the pixel of interest or to a particular portion of a related halftone screen. Rank order based error diffusion provides compact halftone dots without patterning artifacts. An image processing system operative to perform rank order error diffusion includes a pixel ranker and an error diffuser. In a xerographic environment the image processing system includes a xerographic printer.

19 Claims, 12 Drawing Sheets

RANK-ORDER ERROR DIFFUSION IMAGE PROCESSING

BACKGROUND OF THE INVENTION

1. Field of the Invention

The invention is related to the art of processing gray level and unsaturated color images. It finds particular application where a halftoned image is scanned into an image processing system for the purpose of further processing or copying. However, the invention is also beneficially applied in the processing of images from other sources, including but not limited to, Adobe gray tile, JPEG uncompressed images, scanned line art and anti-aliased images. (Adobe is a registered trademark of Adobe Systems Incorporated.)

2. Description of Related Art

Binary halftone images consist of a multitude of tiny marked spots on an unmarked background. The spots are laid out in a grid. For example, the spots are laid out with the structure of a halftone screen. When a halftone image is scanned, for example, during a copying procedure, it is highly unlikely that the locations of marked and unmarked portions of the image exactly coincide with the locations of sensors in the scanning device. Therefore, a marked spot may only be partially in the field of few of a related image sensor. For this and other reasons, scanned halftone images tend to include gray edges around the halftone spots or dots. To print such grayed halftones, or grayed halftones from other sources, it is necessary to convert the gray level values of the scanned image into a binary (mark or unmark) form or to correct or remove them.

Several methods for converting grayed images into a binary form are known. For example, images such as these are binarized through thresholding, re-halftoning, and through a variety of error diffusion techniques.

Problems exist with each of these known methods. For example, simple thresholding removes all intermediate gray levels and therefore can introduce an unacceptably large gray error. In re-thresholding, the frequency components of the new halftone screen can combine undesirably with a halftone grid pattern of the original or scanned image to produce objectionable moiré patterns. Conventional error diffusion can usually render a scanned halftone without pattern artifacts. However, conventional error diffusion techniques often produce images with excessive fragmentation of dots. In at least some environments, such as, for example, some xerographic environments, dot or spot fragmentation is to be avoided. Compact dots are more forgiving of non-linearities and process drifts associated with reprographic devices than are tiny dot fragments associated with a diffuse fragmentary dot. For example, a small dimensional offset in the size of a tiny dot fragment represents a larger dot gain error than does the same dimensional offset applied to a large compact dot. Dot gain errors are perceived as errors in lightness or darkness of an image or portions of an image.

The problems of the prior art binarization methods are best illustrated in FIG. 1–FIG. 6.

FIG. 1 represents an original halftoned image that has been scanned into an image processing system resulting in a scanned image 110. The original halftone was made with an eighty-five line per inch forty-five degree dot screen. That screen beat against a grid pattern of the scanning device. The scanning device grid results from a layout of scanner sensors and a sampling frequency of the scanners. As a result, the scanned image 110 includes a subtle checkerboard moiré pattern 114. Additionally, referring to FIG. 2, (which is a magnified view 210 of a portion 118 of the scanned image of FIG. 1) due to a lack of correlation between the location of original image dots and the location and layout of scanner sensors (among other things), the dots of the scanned image have gray edges 214, where the original image was made up of high contrast black dots on a white background. Referring to FIG. 3 and FIG. 4, simple thresholding can be used to remove the gray edges and maintain dot compactness, as is evident in a magnified view 310 of a portion 410 of a thresholded version 414 of the scanned image 110. However, thresholding has the adverse effect of improving the contrast of the subtle moiré pattern 114 thereby generating a clearer and more distinct moiré pattern 418 in the thresholded version 414.

Re-halftoning also maintains dot compactness. However, as will be understood by those of skill in the art, re-halftoning introduces additional moiré effects.

Referring to FIG. 5 and FIG. 6, known error-diffusion techniques such as, for example, Floyd-Steinberg error-diffusion yield an error-diffusion version 510 of the scanned image 110. The error-diffusion version 510 is relatively moiré free. Not only does Floyd-Steinberg error-diffusion not add patterning artifacts to the image; it also reduces the effect of moiré that were present in the scanned image 110. However, as is apparent in a magnified view 610 of a portion 614 of the error-diffusion version 510, error-diffusion introduces dot fragmentation 618 into the image. This dot fragmentation tends to give the image a noisy appearance. Additionally, as explained above, dot fragmentation increases the susceptibility of the image to spatial non-uniformity, temporal instability and dot gain errors of, for example, a rendering device.

Due to the above described problems and limitation of prior art binarization or quantization reduction methods, there has been a desire for a binarization or quantization reduction method that improves or maintains dot compactness while at the same time eliminating, reducing or not contributing to the presence of patterning artifacts in a reduced quantization version of a grayed halftone image or other gray edged images, such as, for example, Adobe gray tile, JPEG uncompressed images, scanned line art and anti-aliased images.

BRIEF SUMMARY OF THE INVENTION

To that end, an improved method of preparing an image for rendering on a reduced quantization level device has been developed.

One embodiment is a method of halftoning an image that includes receiving a pixel value from an image, selecting a diffusion mask encompassing neighboring pixels, selecting a halftoning threshold, comparing the pixel value to the selected halftone threshold to make a marking decision, calculating an error value based on the pixel value and the marking decision, and diffusing error to at least one selected neighboring pixel within the diffusion mask based on the calculated error value, the neighboring pixel selection being based on pixel values of a plurality of neighboring pixels within the diffusion mask.

For example, the neighboring pixels are ranked according to pixel values of the neighboring pixels. Depending on a sign of the calculated error, the first or last ranked pixels receive error. In some embodiments residual or undistributed error is progressively applied to next ranked pixels until either all the error has been distributed or there are no more remaining neighboring pixels available to receive error. In some embodiments the amount of error distributed to any one pixel is limited by a maximum or minimum pixel value or by a clipping limit. In other embodiments the error value itself is limited.

Another embodiment is a method of preparing a renderable version of an image for rendering on a device having a reduced number of quantization levels as compared to an available version of the image. The method includes selecting a processing path for processing the available version of the image, selecting at least one diffusion mask based on a compatibility with the selected processing path, selecting a pixel of interest from the available image based on the selected processing path, selecting a set of neighboring pixels based on the selected pixel of interest and the selected diffusion mask, making a marking decision based on a pixel value of the pixel of interest, calculating an error value based on the marking decision, ranking the neighboring pixels according to pixel values of the neighboring pixels, and, diffusing error, based on the calculated error value, to at least one neighboring pixel based on the ranking of the neighboring pixels.

In some embodiments of the method of preparing a renderable version of an image, selecting a processing path curve includes selecting a Hilbert curve, a Peano curve, a side-to-side raster curve, or a serpentine raster curve.

In some embodiments ranking the neighboring pixels according to pixel values further comprises ranking the neighboring pixels according to a combination of pixel values and a measure of neighboring pixel positions.

In some embodiments diffusing error comprises modifying at least one threshold value associated with the at least one neighboring pixel. In other embodiments diffusing error comprises modifying at least one pixel value associated with the at least one neighboring pixel.

An image processing system operative to perform rank order error diffusion includes a pixel ranker operative to receive information about a set of selected neighboring pixels, and assign a rank to the selected neighboring pixels based on pixel values of the neighboring pixels, a thresholder operative to compare a pixel value of a pixel of interest to a threshold value to generate a comparison result, a marker operative to make a marking decision based on the comparison result, and an error diffuser operative to calculate an error value based on the pixel value of the pixel of interest and the marking decision, and to modify a value of at least one of the selected neighboring pixels, based on the rank of the selected neighboring pixel and the calculated error value. In a xerographic environment, the image processing system also includes a xerographic printer.

One advantage of the present invention resides in increased halftone dot compactness as compared to other error diffusion methods.

Another advantage of the present invention is found in a reduction or elimination of patterning artifacts as compared to other halftoning methods.

Yet another advantage of the present invention is found in a preferred rendering of grayed edges found around scanned line art and anti-aliased images Yet another advantage of the present invention is related to an improved temporal stability and spatial uniformity seen in rendered images.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various procedures and arrangements of procedures. The drawings are only for purposes of illustrating preferred embodiments, they are not to scale, and are not to be construed as limiting the invention.

DETAILED DESCRIPTION OF THE INVENTION

Figures 1, 2:
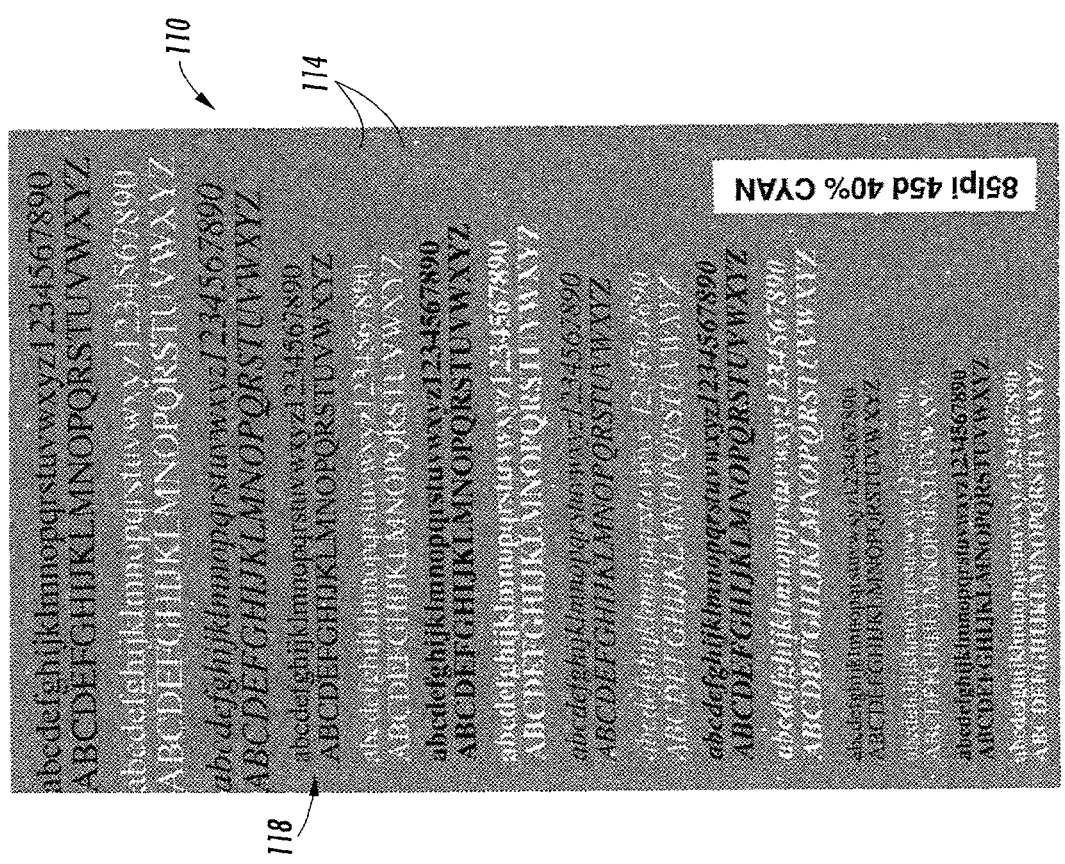
FIG. 1 and FIG. 2 represent a scanned halftone image and a magnified view of a portion of the scanned halftone image, respectively.
Figure 4:
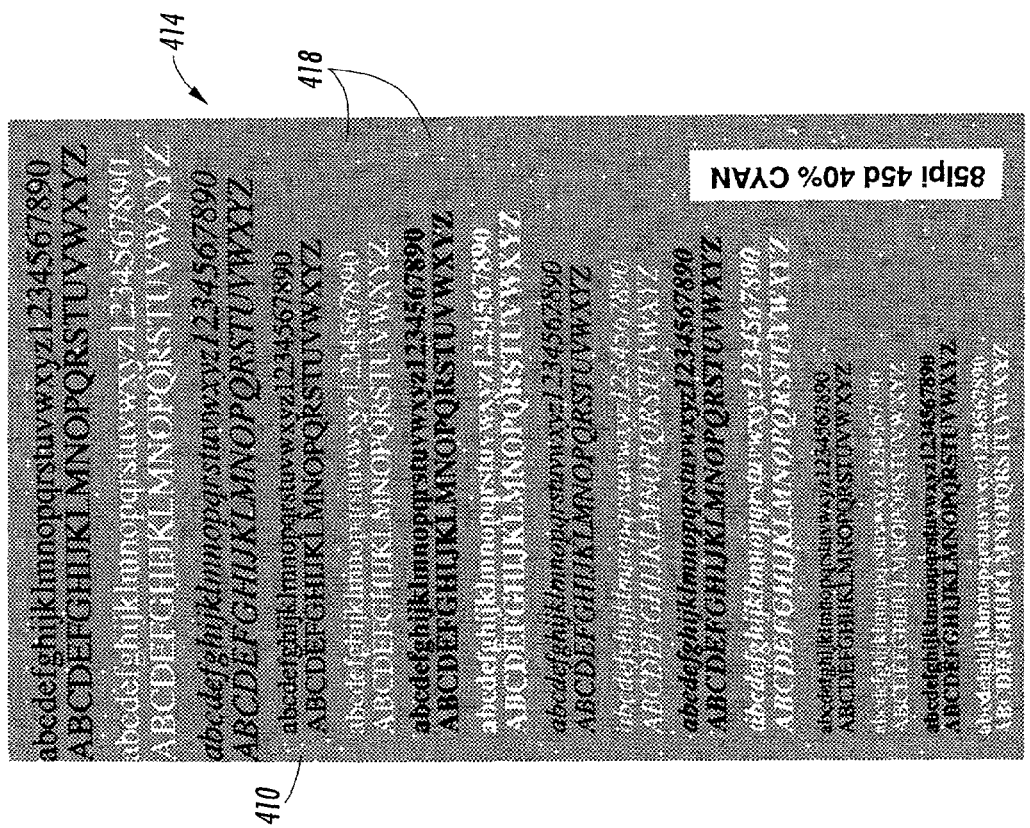
FIG. 4 is a renderable version of the scanned halftone image of FIG. 1, generated through a simple thresholding procedure.
Figure 3:
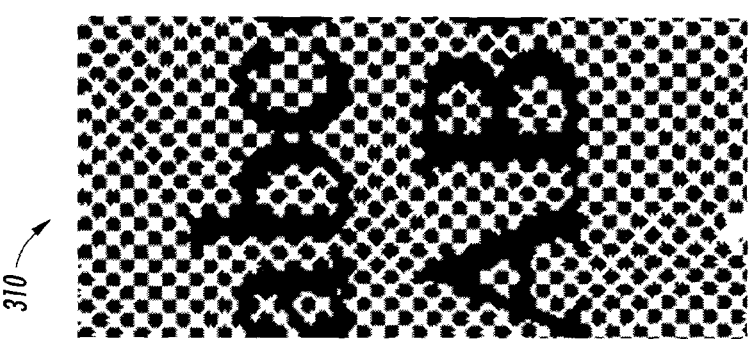
FIG. 3 is a magnified view of a portion of FIG. 4.
Figures 5, 6:
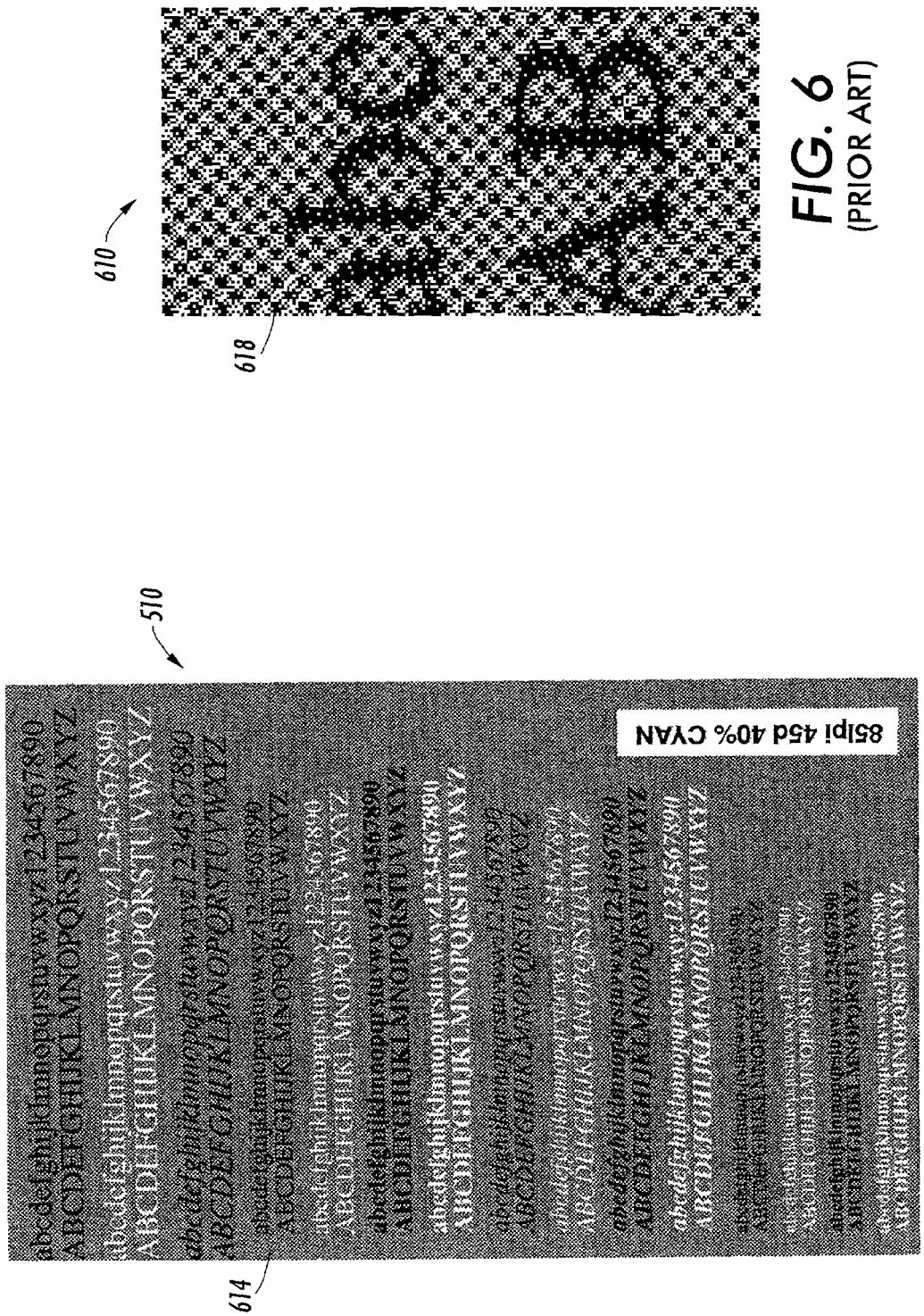
FIG. 5 and FIG. 6 are a renderable version of the scanned halftone image of FIG. 1, generated through standard Floyd-Steinberg error diffusion, and a magnified view of a portion of the standard Floyd-Steinberg error diffusion generated version, respectively.
Figure 8:
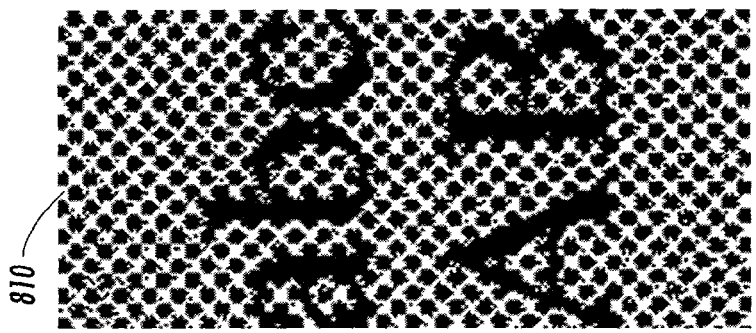
FIG. 7 and FIG. 8 are a renderable version of the scanned halftone image of FIG. 1, generated through a rank ordered error diffusion method, and a magnified view of a portion of the rank ordered error diffusion method generated version, respectively.
Figure 7:
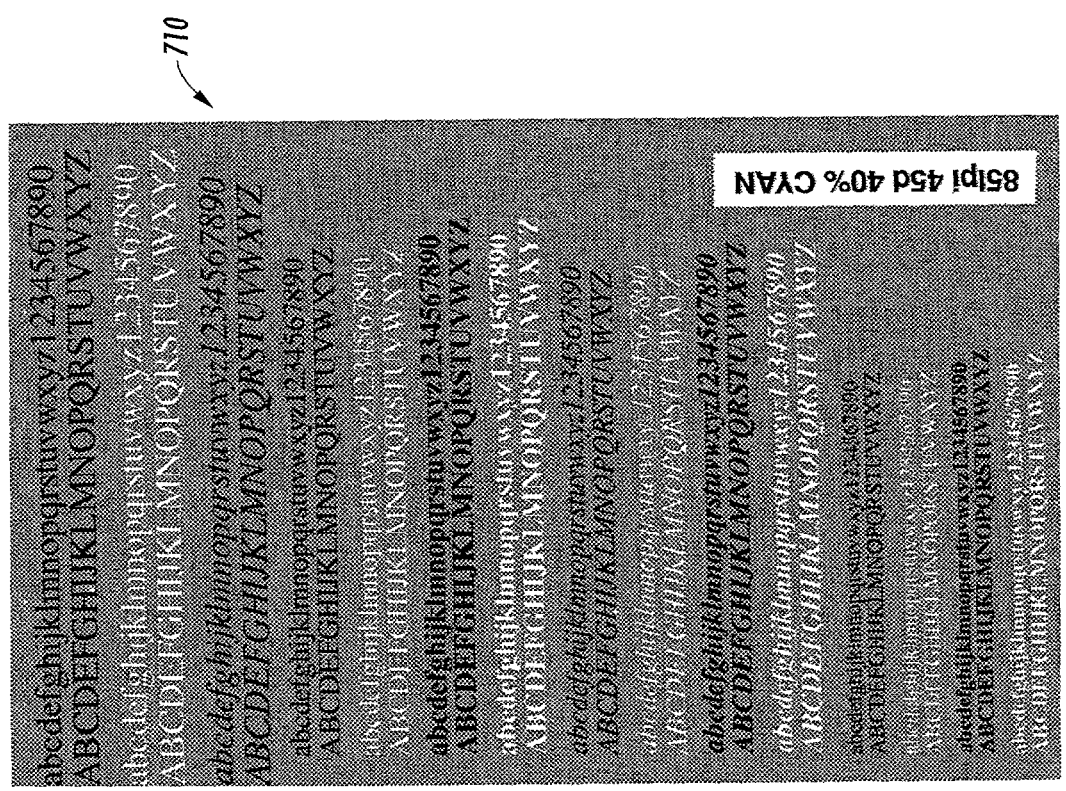

Referring to FIG. 7, in contrast to the prior art methods described above, rank-order error diffusion yields a rank-order error-diffusion version 710 of the scanned halftoned image 110 that is relatively free of pattern artifacts and, referring to FIG. 8, at the same time, is comprised of relatively compact dots 810. As a result, when rendered, the rank-order error-diffusion version 710 does not appear noisy and is not subject to the temporal stability, spatial non-uniformity and dot gain errors that are apparent in images prepared by prior art error diffusion methods.

Figure 9:
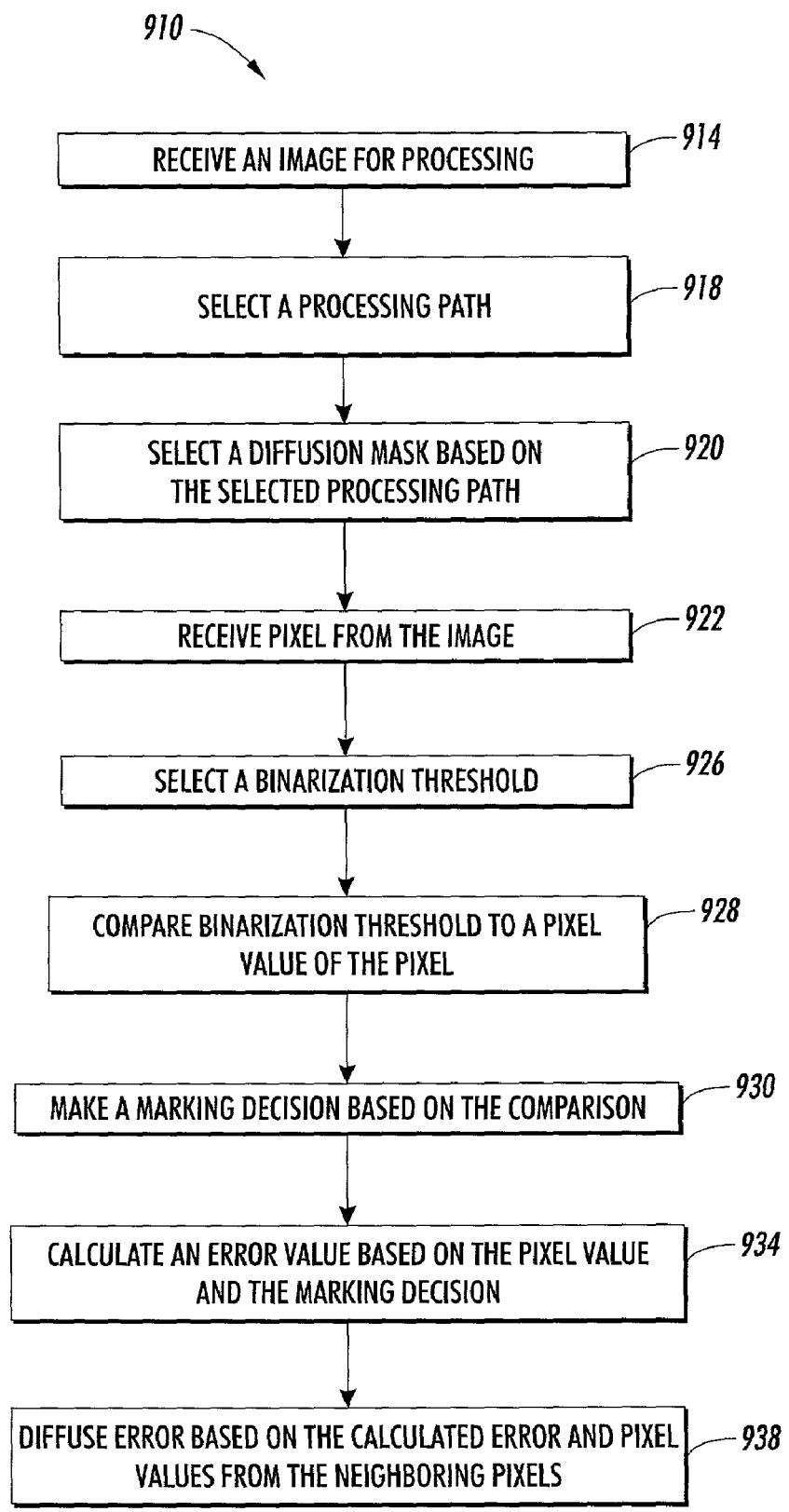
FIG. 9 is a flow chart outlining a method operative to generate a renderable version of an image. The method is based on rank order error diffusion.

Referring to FIG. 9, a method 910 for performing rank-order error diffusion includes receiving an image for processing 914, selecting a processing path 918 across the image, selecting a diffusion mask 920 or set of diffusion masks based on the selected processing path, receiving a pixel from the image 922, selecting a binarization threshold 926, comparing the binarization threshold to a pixel value of the pixel 928, making a marking decision 930 based on the results of the comparison, calculating an error value 934 based on the pixel value and the marking decision, and diffusing error 938 to neighboring pixels within the diffusion mask, based on the calculated error and pixel values of the neighboring pixels.

An image can be received 914 from any image source. Rank-order error diffusion is beneficially applied to scanned halftone images as well as, for example, Adobe gray tile and JPEG uncompressed images.

Selecting a processing path 918 across the image includes, for example, choosing from among a set of space filling curves, a most suitable or convenient space filling curve, based, for example, on a characteristic of the image to be processed or a desired rendering output. The set of space filling curves may include for example, a simple raster scan such as the common repeating left to right or side to side scan, which typically begins at the top of an image and progressively scans a line from a first side to a second side and then drops to the next line and scans that line in the same first side to a second side manner. Additionally, the set of space filling curves may include more complicated scanning paths that follow, for example, serpentine raster scans, Hilbert or Peano curves or other fractal type patterns. Selection trade offs between these curves are known in the art. Among the trade offs are complexity of implementation verses a tendency to hide error diffusion artifacts, such as, for example, worm like structures that are sometimes visible in images processed through prior art error-diffusion methods.

Figure 10:
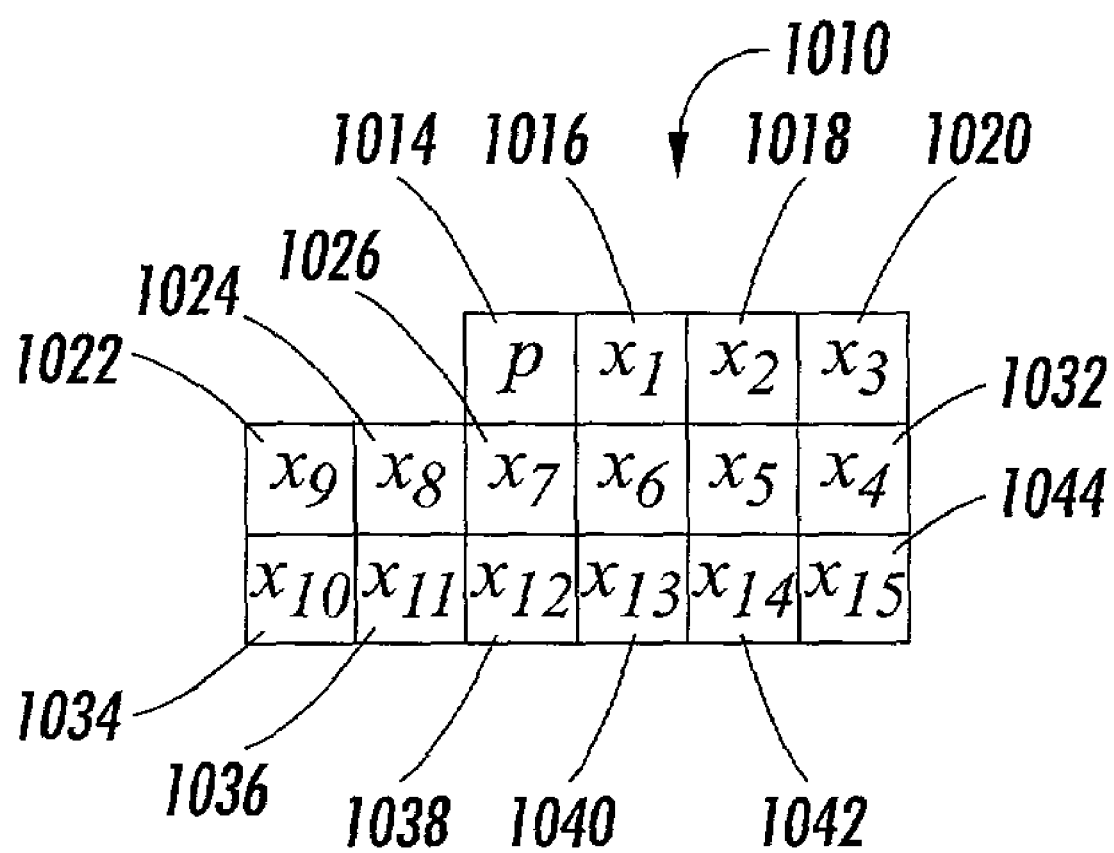
FIG. 10 is a diagram of an exemplary diffusion mask.

The selection of a processing path 918 can influence a diffusion mask selection 920. Referring to FIG. 10, a diffusion mask, such as exemplary diffusion mask 1010, defines a neighborhood of pixels for receiving diffusion error. In the exemplary diffusion mask 1010 a current pixel of interest 1014 is shown in relation to neighboring pixels 1016–1044 of the diffusion mask. It is preferred that the pixels that receive error be unprocessed pixels. Therefore, a diffusion mask is preferably selected to encompass only pixels that are yet to be processed If a simple left to right scanning path is chosen, then, as shown in the exemplary diffusion mask 1010, the diffusion mask can simply encompass pixels to the right and below a current pixel of interest. If a serpentine path is chosen then the relative location of unprocessed pixels to the current pixel of interest depends on the location of the current pixel of interest. Sometimes the unprocessed pixels are to the right of the current pixel and, sometimes the unprocessed pixels are to the left of the current pixel. In this case it may be preferable to select two diffusion masks, a first mask for use when processing moves toward the right and a second mask for when processing moves toward the left. When Hilbert, Peano or other space filling curves are used as processing paths, a plurality of diffusion masks may be required, one for each possible path direction. The shape of the diffusion masks is selected to avoid including previously processed pixels. Alternatively, a single diffusion mask, with a shape that generally surrounds the current pixel of interest may be chosen (for example, for use with Hilbert, Peano and other fractal based space filling curves). In this case, as processing meanders around the image, previously processed pixels are treated as ineligible to receive error even though they may fall within the area encompassed by the diffusion mask.

Receiving a pixel from the image 922 includes receiving a pixel value of the next pixel to be processed or a new current pixel of interest. Additionally, receiving a pixel from the image may include receiving pixel location (within the image) information about the pixel. Furthermore, pixel values and/or pixel storage locations within an image memory of an image processing system may be received with regard to pixels encompassed by the selected or active diffusion mask.

Selecting a binarization (or quantization) threshold 926 can be as simple as determining a single threshold value for the entire image, such as for example, a threshold value of 128. Alternatively, a dither matrix or halftone screen can be selected to provide a threshold for a pixel based on a location of the pixel within the image. A threshold value is then selected from the dither matrix or halftone screen based on the location of the pixel.

Furthermore, while rank-order error diffusion is described here in terms of modifying pixel values, it is considered equivalent or nearly equivalent to instead modify threshold values of thresholds that are related to pixels within the diffusion mask. For example, where rank-order error diffusion is described in terms of adding an error related value to a pixel value of a particular pixel, it is equivalent or nearly equivalent to subtract the error related value from a threshold associated with the particular pixel. Therefore, selecting a threshold may include selecting a threshold that has been modified by error diffused from one or more previously processed pixels.

Comparing the binarization or quantization threshold to a pixel value of the pixel 928 typically involves a relational operation, such as, a <or > comparison or a subtraction operation between the binarization threshold and the pixel value in order to determine which of the threshold and pixel value is larger. Alternatively the order of the operands may be switched. Furthermore, other sorts of comparisons may also be used. For example, one of the pixel value and the threshold may be modified by a weighting or scaling factor before the comparison is made. The scaling factor is, for example, a means for lightening or darkening the image.

Making a marking decision 930 based on the results of the comparison includes deciding to place a mark when the pixel value exceeds the threshold and deciding not to place a mark when the pixel value does not exceed the threshold. Alternatively, the sense of the marking decision may be reversed. Marks may be placed when the threshold exceeds the pixel value. The marking decision may result in a mark being place on a print medium, such as a sheet of paper or velum. Alternatively the marking decision may be simply recorded in an image memory, or in an electronic storage device of an image processing system, or transmitted to another device, for example, by a computer network. We use the phrase—making a marking decision—here because the invention is most often used in conjunction with marking devices and binary marking devices in particular. However, "making a marking decision" should also be interpreted broadly to include "making a quantization decision.". The invention can be used, for example, to prepare images for efficient data transmission, or for rendering on a device with more than 2 quantization levels. The invention could, for example, be used in lowering the quantization resolution of a pixel from 10 bits/pixels to 8 bits/pixels, thereby reducing an amount of bandwidth required to transmit an image.

Calculating an error value 934 based on the pixel value and the marking decision can be as simple as subtracting a value related to the marking decision from the pixel value. For example, where an eight-bit value is used to represent a pixel value and where black is represented by the value 255 and white is represented by the value 0, a pixel value of 200 and a threshold value of 128 would lead to a decision to place a black mark. The black mark is related to a pixel value of 255. Therefore, the mark would be 55 counts too dark and there is a darkness (or lightness) error of 55. Subtracting the value related to the marking decision (255) from the pixel value (200) leads to a calculated error value of −55. This error or an error value based on this error can be diffused to one or more neighboring pixels in an effort to lighten the neighboring pixels in order to compensate for the overly dark marking decision made for the current pixel.

Diffusing error 938 to neighboring pixels within the diffusion mask, based on the calculated error and pixel values of the neighboring pixels, includes sorting or ranking neighboring pixels (within the selected diffusion mask) according to pixel values of the neighboring pixels and distributing the calculated error (or a value that is a function of the calculated error), to at least one of the neighboring pixels, based on the pixels position within that sorting or ranking. This distribution or diffusion can be carried out in a wide variety of ways. A number of preferred rank order based error diffusion methods will be described presently. It is to be understood that certain aspects of each of the exemplary methods are optional and can be, for example deleted from the method they are described in relation to. Additionally, it will be clear to those of skill in the art that certain aspects left out of the descriptions of some embodiments can be added to or combined with those embodiments to yield still other embodiments.

Figure 11:
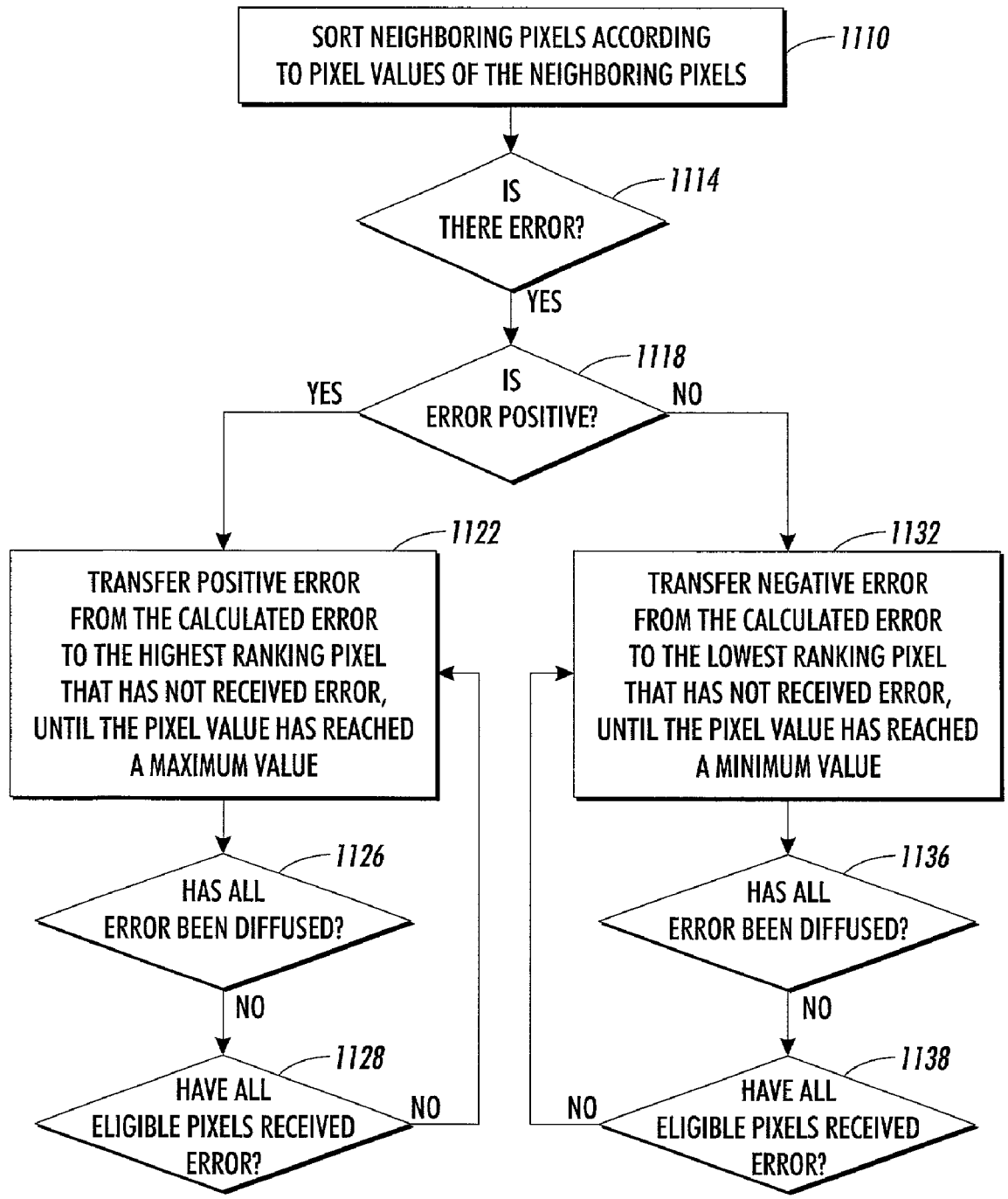
FIG. 11 is a first embodiment of a portion of the method of FIG. 9.

Referring to FIG. 11, in a first embodiment, diffusing error 938 to neighboring pixels within the selected diffusion mask, based on the calculated error and pixel values of the neighboring pixels includes sorting neighboring pixels 1110 (pixels within the diffusion mask) according to pixel values of the neighboring pixels. In other words, the neighboring pixels are ranked according to darkness or lightness as represented by the numerical pixel values of the pixels. For example, the darkest pixel or the pixel with the highest value is given the first rank or ranked number one. The lightest pixel, or the pixel with the lowest pixel value is given the last rank or a rank of the highest number.

An error check 1114 determines if the calculated error value is non-zero. If the calculated error is non-zero processing proceeds. If the calculated error value is zero then there is no error to diffuse and processing is diverted to waiting for a new pixel to process.

A sign check 1118 determines the sign of the error and diverts processing accordingly.

If the error is positive then error is transferred to the highest valued neighboring pixel 1122 that has not yet received an error distribution. The error is transferred up to a maximum value. For example, in a system where an eight-bit value is used to represent gray levels ranging from 0 to 255, 255 may be a maximum value allowed for a pixel. In such a system, where a calculated error value is, for example, 100 and the first ranked pixel or pixel with the highest value has a pixel value of 220, 35 counts of the calculated error value are transferred to the first ranked pixel. At the end of the operation the calculated error value is lowered to 65 and the pixel value of the first ranked pixel is raised to the maximum value of 255.

A diffusion completeness check 1126 determines whether or not error remains to be distributed. If, as in the example above, error remains to be diffused or distributed, processing proceeds to an eligible pixel check 1128. In the eligible pixel check 1128 a determination is made as to whether there are additional neighboring pixels available to receive error. If additional error and additional pixels are available, processing returns to transferring positive error to the next highest ranked pixel 1122. If all the error has been diffused, or if there are no more eligible pixels available, processing returns to wait to receive a new pixel of interest.

If the error is negative, then error is transferred to the lowest valued neighboring pixel 1132 that has not yet received an error distribution. The error is transferred up to a minimum pixel value. For example, in a system where an eight-bit value is used to represent gray levels ranging from 0 to 255, 0 may be a minimum value allowed for a pixel. In such a system, where a calculated error value is, for example, −100 and the first ranked pixel or pixel with the highest value has a pixel value of 20, −20 counts of the calculated error value are transferred to the last ranked pixel. At the end of the operation the calculated error value is raised to −80 and the pixel value of the last ranked pixel is lowered to the minimum value of 0.

A diffusion completeness check 1136 determines if error remains to be distributed. If, as in the example above, error remains to be diffused or distributed, processing proceeds to an eligible pixel check 1138. In the eligible pixel check 1138 a determination is made as to whether there are additional neighboring pixels available to receive error. If additional error exists and additional pixels are available, processing returns to transferring negative error to the next lowest ranked pixel 1132. If all the error has been diffused, or if there are no more eligible pixels available, processing returns to waiting to receive a new pixel of interest.

If additional error remains when no additional neighboring pixels are available then the additional error can be discarded or the diffusion mask can be increased to provide more neighboring pixels. Alternatively, the maximum and minimum pixel values may be unrelated to pixel saturation or the maximum and minimum values imposed by the size of a digital byte or word. Instead the maximum and minimum values may be selected to provide a clipping function. A clipping function can be employed to prevent runaway conditions such as ringing and undue error propagation across an image.

The following pseudo code illustrates how the first embodiment of the rank order error diffusion method of FIG. 9 and FIG. 11 might be implemented in software. This pseudo code is intended as an example of distributing error up to a saturation level of the pixel. This may involve several pixels receiving error.

---

Receive a pixel p for processing;
Threshold and calculate error and make marking decision:
if p < Threshold value /* (e.g. 128) */
    p = 0, error = p;
else
    p = 255, error = p − 255.
/* setting p equal to zero or 255 is, in effect, making the marking decision */
Sort neighboring pixels $x_i$, i = 1,. . .n to generate rank ordered pixels $y_j$, j = 1,. . .n (1110) with $y_{j-1}$ < $y_j$.
/* pixels $x_i$, i = 1,. . .n represent neighboring pixels within a diffusion mask.

```
    For example, see the neighboring pixels 1016–1044 of the exemplary diffusion
    mask 1010. */
    Pass error
    if error >0: /* Pass positive error onto high ranking pixel(s) (sign check
1118)*/
        while error !=0/* error check 1126 */
            j = 1;
            if yj + error <= 255 /* Add complete error to high ranked pixel if it
does not drive to over saturation 1122*/
                yj = yj + error, error = 0;
            else      /* Add error up to saturation, determine remaining error to pass
onto next in rank 1122*/
                yj= 255, error = error − (255 − yj);
        j++; /* loop back to try to diffuse remaining error to the next highest ranked pixel
*/
end
if error <0: /* (sign check 1118)*/
    while error != 0
        j = n /* lowest ranked pixel */
        /*Pass negative error onto lowest ranking pixel(s) until minimum value is reached
(1132)*/
            if yj + error>=0
                yj = yj + error, error = 0; /* adding negative error drives the pixel
    value toward 0*/
            else
                yj = 0, error = error + yj;
            j−−;
    end
```

The following pseudo code is a more general form of the code above. This pseudo code is intended to teach the concept of distributing error to neighboring pixels up to a clipping level. In the following code C+ and C− represent positive and negative clipping levels, respectively. C+ and C− can be constants or can have values that are functions. For example, the values of C+ and C− can be functions of pixel rank or spatial position. Preferably C+ and C− are related by: C+−(saturated pixel value (e.g. 255))=−C−

```
Receive a pixel p for processing;
Threshold and calculate error and make marking decision:
if p < Threshold value /* (e.g. 128) */
    p = 0, error = p;
else
    p = 255, error = p − 255.
/* setting p equal to zero or 255 is, in effect, making the marking decision */
Sort pixels xi , i = 1,. . .n to generate rank ordered pixels yj , j = 1,. . .n (1110)
with yj−1<yj and select values or functions for C+ and C−.
/* pixels xi, i = 1,. . .n represent neighboring pixels within a diffusion mask.
For example, see the neighboring pixels 1016–1044 of the exemplary diffusion
mask 1010. */
Pass error
if error >0: /* Pass positive error onto high ranking pixel(s) (sign check
1118)*/
    while error !=0 /* error check 1126 */
        j = 1;
        if yj + error <= C+ /* Add complete error to high ranked pixel if it
does not drive to over the positive clipping value C+ 1122*/
            yj = yj + error, error = 0;
        else      /* Add error up to the clipping value, determine remaining error to
pass onto next in rank 1122*/
            yj=C+, error = error − (C+ − yj);
        j++;/* loop back to try to diffuse remaining error to the next highest ranked pixel
*/
    end
if error <0: /* (sign check 1118)*/
    while error != 0
        j = n /* lowest ranked pixel */
        /*Pass negative error onto lowest ranking pixel(s) until negative clipping value is
reached (1132)*/
            if yj + error>=C−
                yj = yj + error, error = 0; /* adding negative error drives the pixel
```

```
value toward C-*/
    else
        yj = C-, error = error + (yj - C-);
        j--; /* loop back to try to diffuse remaining error to the next lowest
ranked pixel */
end
```

Figure 12:
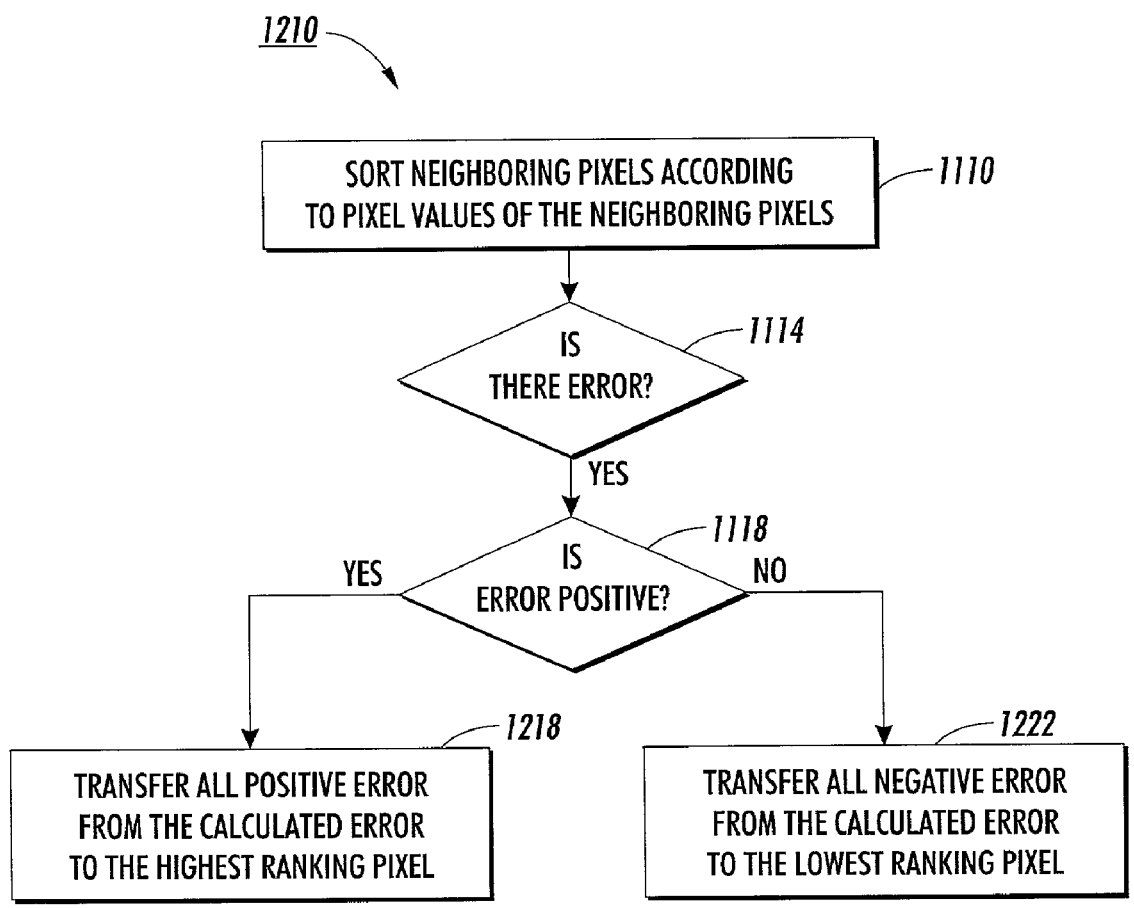
FIG. 12 is a second embodiment of a portion of the method of FIG. 9.

Referring to FIG. 12, in a second embodiment 1210 of the method 910 for performing rank-order error diffusion, diffusing error 938 to neighboring pixels within the selected diffusion mask based on the calculated error and pixel values of the neighboring pixels also includes sorting neighboring pixels 1110 according to pixels values of the neighboring pixels, checking error 1114 to determine if the calculated error value is non-zero and a sign check 1118 to determine the sign of the error (if any). These portions of the embodiment are similar to portions of the first embodiment. Therefore, they carry the same reference numerals. The second embodiment 1210 also includes transferring all positive error from the calculated error value to the highest ranking pixel 1218 if the sign check 1118 determines that the error is positive, and transferring all negative error from the calculated error value to the lowest ranking pixel 1222 if the sign check 1118 determines that the error is negative.

If the error is positive then error is transferred to the highest valued neighboring pixel 1218. For example, in a system where a value ranging from 0 to 255 is used to represent gray levels, where a calculated error value is, for example, 100 and where the first ranked pixel has a pixel value of 220, the full 100 counts of the calculated error value are transferred to the first ranked pixel. At the end of the operation the calculated error value is lowered to 0 and the pixel value of the first ranked pixel is raised to the value of 320. This value may be modified (increased further or decreased) again as other pixels are processed. When this pixel is itself processed, any excess value (for example, above the usual limit of 255) may be simply passed as error to one of the pixel neighbors.

If the error is negative then error is transferred to the lowest valued neighboring pixel 1222. For example, in a system where a range of 0 to 255 is used to represent gray levels, where a calculated error value is, for example, −100 and the last ranked pixel or pixel with the lowest value has a pixel value of 20, the full −100 counts of the calculated error value are transferred to the last or lowest ranked pixel. At the end of the operation the calculated error value is raised to 0 and the pixel value of the last ranked pixel is lowered to −80. This value may be modified (increased or decreased further) again as other pixels are processed. When this pixel is itself processed, any excess value (for example, below the usual limit of 0) may be simply passed as error to one of the pixel neighbors.

This pseudo code is intended as an example of how the second embodiment 1210 might be implemented.

```
Receive a pixel p;
Threshold, calculate error and make marking decision:
if p < Threshold value (eg. 128)
    p = 0, error = p;
else
    p = 255, error = p − 255.
    /* setting p equal to zero or 255 is, in effect, making the marking decision */
    Sort pixels xi , i = 1,. . .n to generate rank ordered pixels (1110) (i.e.; find the
maximum pixel value xmax (y1) and minimum pixel value xmin (yn))
    /* pixels xi, i = 1,. . .n represent neighboring pixels within a diffusion mask.
    For example, see the neighboring pixels 1016–1044 of the exemplary diffusion
    mask 1010.*/
    Pass error
    if error >0: /* Pass positive error onto maximum (high ranking) pixel(s) */
        y1 = xmax + error * w;
/* --w-- is a weighting that could be a multiplicative factor or additive term. In the
example given in the text above, a weighting is not used. Weighting is included in this
pseudo code as an example of how concepts illustrated in one embodiment can be
migrated to other embodiments. Weighting will be illustrated in greater detail below.
*/
    if error <0: /* Pass negative error onto minimum (low ranking) pixel(s) 1222
*/
        y1 = xmin + error * w;
```

Note: Instead of using the exact error, the error could have been weighted by factors such as the following: (a) a predetermined constant intended to amplify error or suppress it; (b) a value dependent upon the pixel value; (c) a value dependent upon a measure of the image such as local variance, density, and gradient; (d) a value dependent upon the spatial location of the pixel, e.g., could be periodic or random to give more of a halftone effect or break up regular patterns, respectively.

Figure 13:
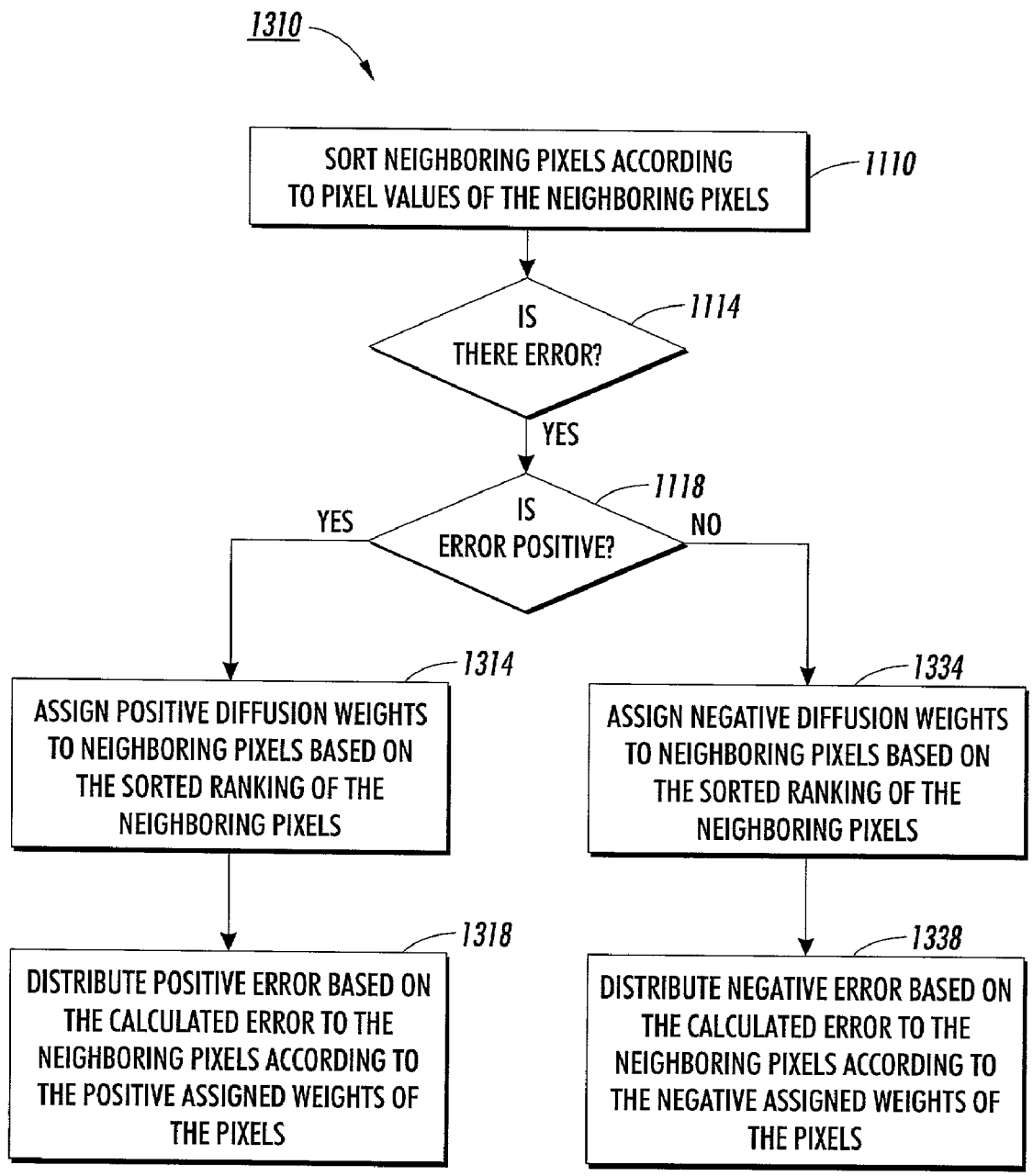
FIG. 13 is a third embodiment of a portion of the method of FIG. 9.

Referring to FIG. 13, in a third embodiment 1310 of the method 910 for performing rank-order error diffusion, diffusing error 938 to neighboring pixels within the selected diffusion mask based on the calculated error and pixel values of the neighboring pixels includes sorting neighboring pixels 1110, checking error 1114, and sign checking 1118. These portions of the embodiment are similar to portions of the first embodiment described with reference to FIG. 11. Therefore, they carry the same reference numerals. The third embodiment 1210 also includes assigning positive diffusion weights to neighboring pixels based on the sorted ranking of the neighboring pixels 1314 if the sign check 1118 determines that the error is positive. Positive error is distributed 1318 to the neighboring pixels based on the assigned positive diffusion weights. For example, the first ranked pixel may be assigned a positive diffusion weight of fifty percent or 0.5. The second ranked pixel may be assigned a positive diffusion weight of thirty two percent or 0.32 and a third ranked neighboring pixel may be assigned a positive diffusion weight of eighteen percent or 0.18. (The diffusion weights are not restricted to percentages. However, using percentages makes these explanations easier to understand.)

In a system where those exemplary positive diffusion weights are assigned and where a calculated error value is, for example, 100, and where the pixel with the highest value has a pixel value of 220, the second ranked pixel has a pixel value of 207 and the third ranked pixel has a pixel value of 198; fifty percent of the calculated error value or 50 counts of error value are distributed to the first ranked pixel, thirty two percent or 32 counts are distributed to the second ranked pixel and eighteen percent or 18 counts of error are distributed to the third ranked pixel. At the end of the operation the pixel value of the first ranked pixel is raised to 270, the pixel value of the second ranked pixel is raised to 239 and the pixel value of the third ranked pixel is raised to 216.

If the sign check 1118 determines that the calculated error is negative, negative diffusion weights are assigned to neighboring pixels based on the sorted ranking 1334. Here the term—negative weights—is not meant to imply that the weights themselves have negative values or negative signs associated with them. Instead the term—negative weights—is used to associate the weights with the distribution of negative values of calculated error. Negative error is distributed 1338 to the neighboring pixels based on the assigned negative diffusion weights. For example, the last ranked pixel may be assigned a negative diffusion weight of fifty percent or 0.5. The second to last ranked pixel may be assigned a negative diffusion weight of thirty two percent or 0.32 and a third to last ranked pixel may be assigned a negative diffusion weight of eighteen percent or 0.18.

In a system where those exemplary negative diffusion weights are assigned and where a calculated error value is, for example, −100, and the pixel with the lowest value has a pixel value of 20, the second ranked pixel has a pixel value of 31 and the third ranked pixel has a pixel value of 50; fifty percent of the calculated error value or −50 counts of error value are distributed to the last ranked pixel, thirty two percent or −32 counts are distributed to the second to last ranked pixel and eighteen percent or −18 counts of error are distributed to the third to last ranked pixel. At the end of the operation the pixel value of the last ranked pixel is reduced to −30, the pixel value of the second to last ranked pixel is reduced to −1 and the pixel value of the third to last ranked pixel is reduced to 32.

Figure 14:
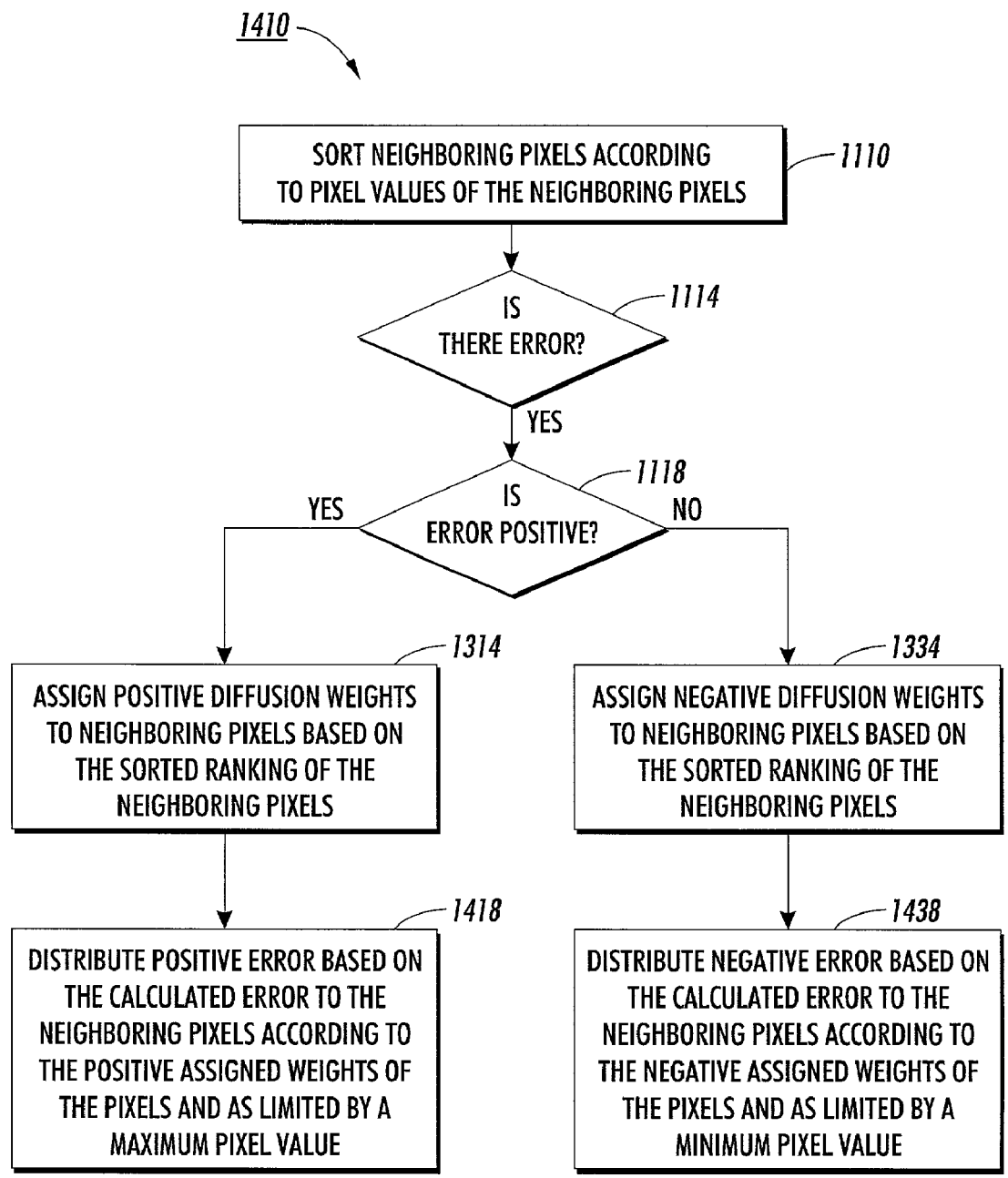
FIG. 14 is a forth embodiment of a portion of the method of FIG. 9.

Referring to FIG. 14, in a fourth embodiment 1410 of the method 910 for performing rank-order error diffusion, diffusing error 938 to neighboring pixels includes sorting neighboring pixels 1110, checking error 1114, and sign checking 1118. These portions of the embodiment are similar to portions of the first embodiment. Therefore, they carry the same reference numerals. Additionally, the forth embodiment 1410 includes assigning positive diffusion weights 1314 to the neighboring pixels for positive error distribution and assigning negative diffusion weights 1334 to the neighboring pixels for negative error distribution. These weight assignment portions of the fourth embodiment 1410 are similar to the weight assignment portions of the third embodiment 1310. Therefore, the weight assignment portions of the fourth embodiment 1410 carry the same reference numerals as the weight assignment portions of the third embodiment 1310.

The fourth embodiment 1410 also includes distributing positive error and distributing negative error. However, in the fourth embodiment distributing positive error includes distributing positive error to neighboring pixels based on the assigned positive weights of the pixels as limited by a maximum value 1418. Positive error is distributed to neighboring pixels as described in reference to the third embodiment 1310, except where a distribution of error to a pixel would cause the value of the pixel to exceed some maximum value.

For example, in a system where an eight-bit value is used to represent gray levels ranging from 0 to 255, 255 may be a maximum value allowed for a pixel. In such a system, where the exemplary positive diffusion weights of fifty, thirty-two and eighteen percent are assigned to the first, second and third ranked pixel, and where a calculated error value is, for example, 100, and where the first ranked pixel has a pixel value of 220, the second ranked pixel has a pixel value of 207 and the third ranked pixel has a pixel value of 198; fifty percent of the calculated error value or 50 counts of error value are initially intended to be distributed to the first ranked pixel, thirty two percent or 32 counts are distributed to the second ranked pixel and eighteen percent or 18 counts of error are distributed to the third ranked pixel. However, distributing 50 counts of error to the first ranked pixel would drive that pixel value to 270, which is beyond the maximum value allowed. Therefore only thirty-five counts of error are distributed to the first pixel. At the end of the operation, the pixel value of the first ranked pixel is raised to the maximum allowed value of 255, the pixel value of the second ranked pixel is raised to 239 and the pixel value of the third ranked pixel is raised to 216. The error that could not be distributed to the first pixel is simply discarded. Alternatively, the error that could not be distributed to the first pixel is distributed to other neighboring pixels through a supplemental error distribution procedure (not shown).

Similarly, in the fourth embodiment distributing negative error includes distributing negative error to neighboring pixels based on the assigned negative weights of the pixels as limited by a minimum value 1438. Negative error is distributed to neighboring pixels as described in reference to the third embodiment 1310, except where the distribution of error to a pixel would cause the value of the pixel to fall below some minimum value. For example, in a system where an eight-bit value is used to represent gray levels ranging from 0 to 255, 0 may be a minimum value allowed for a pixel.

In such a system where the exemplary negative diffusion weights of fifty, thirty-two and eighteen percent are assigned to the first, second and third ranked pixels, and where a calculated error value is, for example, −100, and the pixel with the lowest value has a pixel value of 20, the second to last ranked pixel has a pixel value of 31 and the third to last ranked pixel has a pixel value of 50; fifty percent of the calculated error value or −50 counts of error value is initially intended to be distributed to the last ranked pixel, thirty two percent or −32 counts are intended to be distributed to the second to last ranked pixel and eighteen percent or −18 counts of error are distributed to the third to last ranked pixel. However, distributing −50 counts of error to the last ranked pixel would drive that pixel value to −30 and distributing −32 counts of error to the second to last ranked pixel would drive that pixel value to −1. Both of these pixel values are below the minimum value allowed. Therefore only −20 counts of error are distributed to the last pixel and only −31 counts of error are distributed to the second to last ranked pixel. At the end of the operation the pixel value of the last ranked pixel is lowered to the minimum allowed value of 0, the pixel value of the second ranked pixel is also lowered to 0, and the pixel value of the third ranked pixel is lowered to 32. The error that could not be distributed to the last and second to last pixels is simply discarded. Alternatively, the error that could not be distributed to the last and second to last pixels is distributed to other neighboring pixels through a supplemental error distribution procedure (not shown).

This pseudo code is an example of how the third 1310 and forth 1410 embodiments might be implemented in software.

8 show the result of processing with spatially weighted rank order error diffusion, where, for positive error additive weights of 32, 16, 8 were applied to ×1 1016, ×7 1026, and ×8 1024, respectively and spatial weights of zero were applied to all other pixels. Similar negative weights were applied for negative errors. As shown in FIG. 7 and FIG. 8, halftone dots are well packed and the image shows no pattern artifacts.

Figure 15:
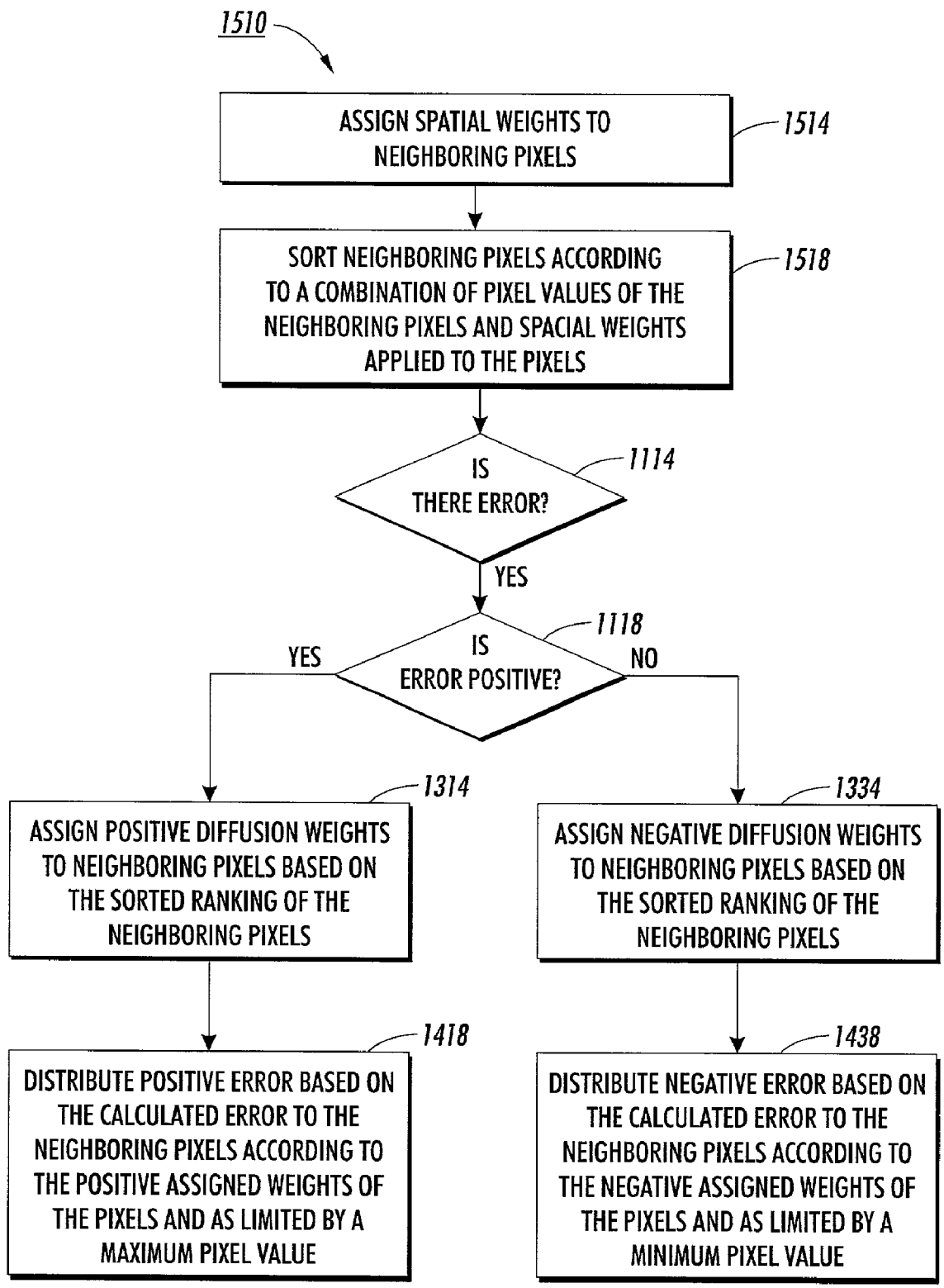
FIG. 15 is a sixth embodiment of a portion of the method of FIG. 9.

Referring to FIG. 15, in a fifth embodiment 1510 of the method 910 for performing rank-order error diffusion, diffusing error 938 to neighboring pixels includes assigning spatial weights 1514 to neighboring pixels within the diffusion mask, sorting neighboring pixels 1518 according to a combination of both pixel values and the assigned spatial weights, checking error 1114, and sign checking 1118. The checking error 1114, and sign checking 1118 portions of the embodiment are similar to portions of the first embodiment.

```
    Receive a pixel p;
    Threshold and calculate error:
    if p < Threshold value (e.g. 128)
        p = 0, error = p;
    else
        p = 255, error = p − 255.
    Sort pixels xi, i = 1,. . .n to generate rank ordered pixels yj, j = 1, . . . n, and
determine positive and negative weighting factors for each pixel;/* pwj, nwj */
    Pass error
    if error >0: /* Pass positive error onto maximum (high ranking) pixel(s) */
        j = 1;/* highest ranked pixel */
        if yj + pwj * error <= maximum value (e.g.255) /* Add complete
error to high ranked pixel if it does not drive the pixel over a maximum value. This
line can be deleted to implement the third embodiment 1310 */
            yj = yj + pwj * error;;
        else       /* Add error up to saturation, discard the residual error. This else
statement and the assignment below can be deleted to implement the third
embodiment 1310 */
            yj= 255;
        j++; /* loop back to try to diffuse remaining error to the next highest
ranked pixel */
    end
    if error <0: /* Add negative error onto minimum (low ranking) pixel(s) */
        j = n/* lowest ranked pixel */
        if yj + nwj * error>= minimum value (e.g. 0) /*This line can be deleted to
implement the third embodiment 1310*/
            yj = yj + nwj * error;
        else       /* Add error up to saturation, discard the residual error. This else
statement and the assignment below can be deleted to implement the third
embodiment 1310 */
            yj = 0;
        j−−; /* loop back to try to diffuse remaining error to the next lowest
ranked pixel */
    end
```

Experiments with the first through fourth embodiments have shown several failure modes. One failure mode is "packing the halftone dots too tightly," which can lead to pattern artifacts due to interaction of the tightly packed dots with a pixel grid. A second failure mode is the creation of fragmented dots, similar to those created by conventional error diffusion methods. Another failure mode is graininess from passing error to distant dots that may be only a little bit closer to saturation than the nearest dot. In a fifth embodiment, when the gray levels of neighboring pixels are ranked, they are ranked with weighting factors that are dependent upon the spatial locations of the pixels relative to the current pixel of interest. For example, referring to the exemplary diffusion mask of FIG. 10, pixels ×1 1016, ×6 1028, ×7 1026, ×8 1024 are given higher spatial weights than other pixels because they are closer to the pixel p. The spatial weighting can be additive or multiplicative. FIG. 7 and FIG. Therefore, they carry the same reference numerals. Additionally, the fifth embodiment 1510 includes assigning positive diffusion weights 1314 to the neighboring pixels for positive error distribution and assigning negative diffusion weights 1334 to the neighboring pixels for negative error distribution. The weight assignment portions of the fifth embodiment 1510 are similar to the weight assignment portions of the third embodiment 1310. Therefore, the weight assignment portions of the fifth embodiment 1510 carry the same reference numerals as the weight assignment portions of the third embodiment 1310. The fifth embodiment 1510 also includes distributing positive error 1418 and distributing negative error 1438. The error distribution portions of the fifth embodiment 1510 are similar to the error distribution portions of the fourth embodiment 1410. Therefore, the error distribution portions of the fifth embodiment 1510 carry the same reference numerals as the error distribution portions of the third embodiment 1410.

Assigning spatial weights 1514 to neighboring pixels can be based on a neighboring pixels distance from the current pixel of interest or some other spatial measure. For example, the assignment of spatial weights can be based on a distance of a neighboring pixel from the center of a halftone dot. A pixel near a dark portion of a halftone dot may be given a spatial weighting to make it more likely to receive darkening error. A pixel near a light portion of a halftone dot may be given a spatial weighting to make it more likely to receive lightening error. Alternatively, the spatial weights include consideration of lightness variation of the neighboring pixels. As a further alternative, the spatial weights may include consideration of a contrast between the neighboring pixels. The degree to which spatial information and these other considerations (variation, contrast and other) contribute to the assigned spatial weight can vary a great deal. Indeed, the spatial component may make little or no contribution. Even though we a calling the ranking weighting a spatial weight, the other components may dominate.

Sorting neighboring pixels 1518 according to a combination of both pixel values and the assigned spatial weights is very similar to the previously described sorting process 1110. The only difference between the two sorting methods is that instead of sorting based solely on pixel values, sorting neighboring pixels 1518 according to a combination of both pixel values and the assigned spatial weights is based on values that results from a combination (i.e.; additive, subtractive, multiplicative or other combination) of a pixel values with assigned spatial weights.

The following pseudo code is intended to illustrate that how rank can be determined using factors in addition to the image values. In this example we use spatial distance to modify the rank.

Note: The general notes of the above examples could be applied here. The weights for ranking of this example could be determined by criteria such as spatial distance from the given target pixel, or another spatial measure such as distance from a halftone dot center. As in error weighting, the rank weighting can be achieved by multitude of processes such as addition and multiplication.

Figure 16:
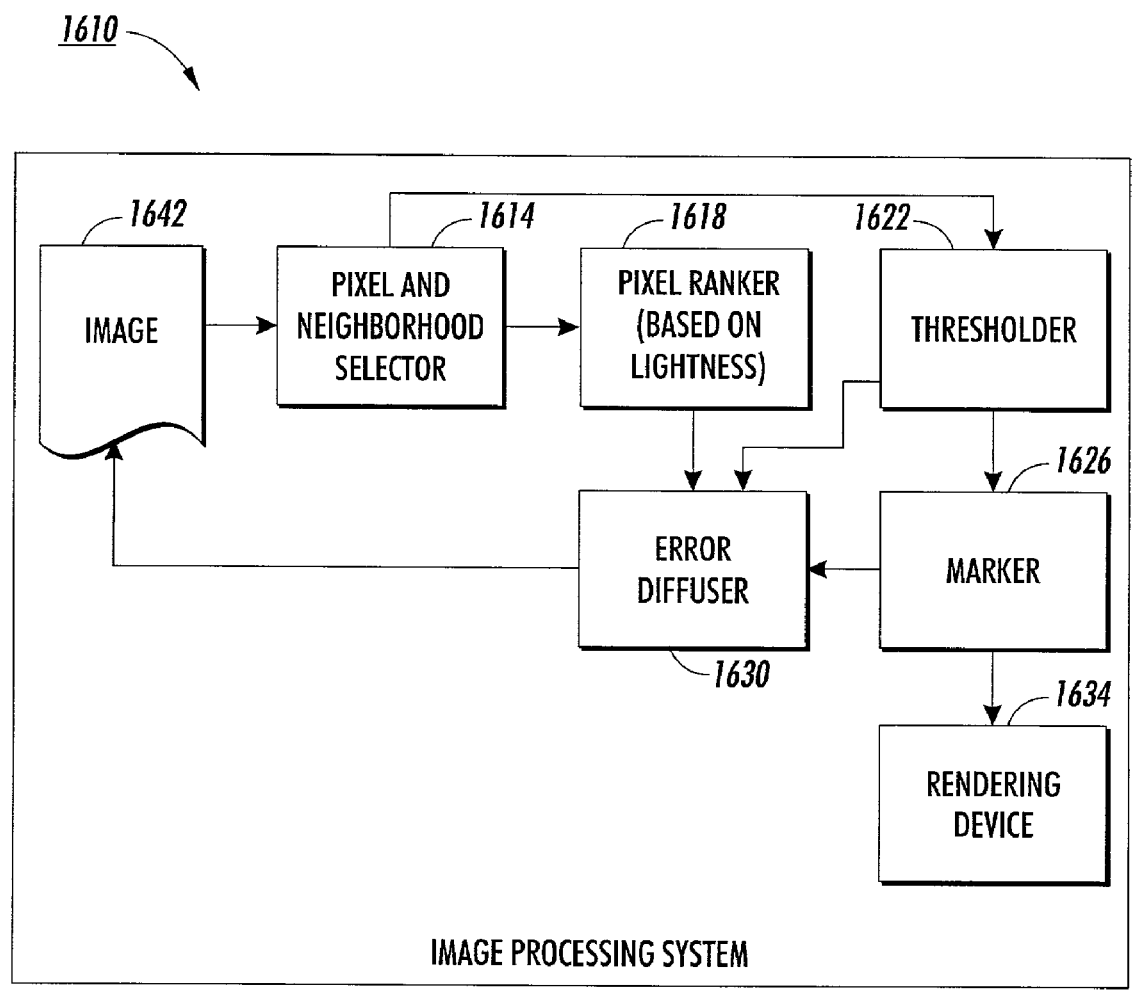
FIG. 16 is a block diagram of a portion of an image processing system operative to perform the method of FIG. 9.

Referring to FIG. 16, a portion of an image processing system 1610 operative to perform the method 910 for performing rank-order error diffusion includes a pixel and neighborhood selector 1614, a pixel ranker 1618, a thresholder 1622, a marker 1626, an error diffuser 1630, and a rendering device 1634.

The pixel and neighborhood selector 1614 selects a processing path or space-filling curve for processing the pixels of an image 1642. Additionally, the pixel and neighborhood selector 1614 selects or generates a diffusion mask or set of diffusion masks that is compatible with the selected processing path. The processing path selection can be based on input received from a system operator or based on an analysis of the image and known or default rendering preferences. For example, the operator (not shown) may be offered a selection of space-filling curves to choose from. Alternatively, the operator may be offered a list of rendering characteristics known to be related to space filling curve selections. Selection of a preferred rendering characteristic is interpreted by the pixel and neighborhood selector 1614 as a request for the use of a related processing path. Selection of a diffusion mask or set of masks may be based on the selected space-filling curve or may be based on operator input. The operator input may be an explicit mask selection or may again be implied through the selection of a preferred rendering characteristic. Alternatively, the pixel and neighborhood selector 1614 may analyze the image 1642 and

```
Receive a pixel p;
Threshold and calculate error:
if p < Threshold (e.g. 128)
    p = 0, error = p;
else
    p = 255, error = p − 255.
    Sort pixels xi * rwi , i = 1,. . .n to generate yj, j = 1, . . . n, with pre-determined
spatial weighting factors rwi and determine the positive and negative error
distribution weighting factors wj
    Pass error
    if error >0: /* Pass positive error onto (high ranking) pixel(s) */
        while error != 0
        j = 1;
        if yj + wj * error <= maximum value (e.g.255) /* Add complete
weighted error to high ranked pixel if it does not drive the pixel value over the
maximum */
            yj = yj + wj * error;
        else    /* Add error up to the maximum value, discard the residue error
from wi * error */
            yj= 255;
            j++;
    end
    if error <0: /* Pass negative error onto (low ranking) pixel(s)*/
        while error != 0
        j = n
        if yj + wj *error>=0
            yj = yj + wj * error;
        else
            yj = 0;
        j--;
    end
``` automatically select a space filling curve and diffusion mask(s) based on characteristics of the image.

Once the processing path and diffusion mask(s) have been selected, the pixel and neighborhood selector 1614 follows the processing path through the input image and selects pixels of interest and neighboring pixels from the image and delivers information about them to the pixel ranker 1618 and the thresholder 1622. The pixel ranker 1618 receives information about the pixel of interest and the neighboring pixels. The thresholder 1622 simply receives information about the pixel of interest.

For example, the pixel ranker 1618 receives pixel value information. Optionally, the pixel ranker 1618 also receives pixel position information. The pixel ranker 1618 ranks the neighboring pixels based on pixel values of the neighboring pixels. Optionally, the pixel ranker 1618 applies spatial weights to the pixel values of the neighboring pixels before sorting or ranking the neighboring pixels. Appropriate spatial weights are either predetermined default values, are indicated by an operator selected rendering preference, or are based on an analysis of the image performed by the pixel ranker 1618. Alternatively, the spatial weights include consideration of lightness variance of the neighboring pixels. As a further alternative, the spatial weights may include consideration a contrast between the neighboring pixels. The pixel ranker 1618 passes pixel information including, for example, pixel values, pixel ranks and pixel position information to the error diffuser 1630

The thresholder 1622 receives pixel value and pixel location information about a current pixel of interest. The thresholder 1622 compares the pixel value of the current pixel of interest to a threshold value. The threshold value may be a constant value, used to compare to all the pixel values of the image or the threshold value may vary. For example, the threshold value may be taken from a halftone screen. The value may be selected from the halftone screen in a manner based on the position information of the current pixel of interest. The thresholder passes the results of the comparison between the threshold value and the pixel value of the current pixel of interest to the marker 1626. For example, the thresholder 1622 tells the marker 1626 whether or not the pixel value of the current pixel of interest is above or below the threshold value. The thresholder also passes the pixel value of the current pixel of interest on to the error diffuser 1630.

The marker 1626 makes a marking decision based on the results received from the thresholder. For example, if the pixel value is above the threshold value the marker decides to place a mark in a position in an output image corresponding to the current pixel of interest. The output image may be an electronic image stored in an electronic memory or buffer. Alternatively, the output image may be an image formed by the rendering device 1634. The marker 1626 passes a value related to the marking decision to the error diffuser 1630. For example, the marker passes to the error diffuser 1630 a value corresponding to a fully saturated mark, such as, for example, 255 (in an eight-bit system) or a value corresponding to a fully unsaturated mark (white or no mark), such as, for example zero.

The error diffuser 1630 compares the value received from the marker to the pixel value of the current pixel of interest and calculates an error value. The error diffuser then transfers or distributes error to one or more neighboring pixel (from within the diffusion mask). The error transfer or distribution is based on the ranking performed by the pixel ranker 1618. Therefore, the error transfer or distribution is based on lightness or darkness of the neighboring pixels, as indicated by one or more pixel value of the pixels. Optionally, the ranking, and therefore the error transfer or distribution, is additionally based on the spatial position of the neighboring pixels. For example, a distance of neighboring pixels from a current pixel of interest may be taken into account during the ranking. Alternatively or additionally, the positions of the neighboring pixels relative to an associated halftone dot are accounted for during the ranking. As explained above, all the error can be transferred to a single neighboring pixel or to a plurality of pixels. Error can be transferred or distributed in a weighted or non-weighted manner. Whether weighted or not, error can be transferred or distributed in a clipped or limited manner or in an unlimited manner.

By transferring or distributing error, the error diffuser 1630 modifies or updates pixel values of some of the neighboring pixels from the image 1642. The pixel and neighborhood selector 1614 then selects a new pixel of interest and a new related set of neighboring pixels based on the previously selected space-filling curve. The functional blocks 1614, 1618, 1622, 1626, 1630 then repeat their functions for the new pixel of interest.

While the image is being processed, or when the entire image has been processed, the marking decisions made by the marker 1626 can be delivered to the rendering device 1634. The rendering device can be a binary rendering device or a multi quantization level rendering device. In a xerographic environment the rendering device 1634 is a xerographic printer. Xerographic printers are known to include a fuser a developer and an imaging member. In other environments the rendering device 1634 can be some other kind of display or printing device. For example, the rendering device can be an ink jet, lithographic or ionographic printer.

The above-described portion of an image processing system 1610, operative to perform the method 910 for performing rank-order error diffusion can be implemented in many ways. Preferably the pixel and neighboring pixel selector 1614, pixel ranker 1618, thresholder 1622, marker 1626, and error diffuser 1630 are implemented in software. The software is stored in a computer memory and run on one or more computational devices such as, for example, one or more microprocessors or digital signal processors. The functional blocks 1614, 1618, 1622, 1626, 1630 can be located or performed in a single device or can be distributed over, and interconnected by, a computer network. The functions of the functional blocks 1614, 1618, 1622, 1626, 1630 can, of course, be organized differently and be performed by functional block of different names.

The invention has been described with reference to particular embodiments. Modifications and alterations will occur to others upon reading and understanding this specification. While the invention has, for the most part, been described in terms of preparing an image for rendering on a binary device, preparing an image for rending on a device with an increased number of quantization levels is contemplated. Those skilled in the art will understand how to modify exemplary embodiments for a number of quantization levels above two. While the invention has, for the most part, been described in terms of applying error to pixel values, it is to be understood that error can equivalently be applied to threshold values. It is intended that all such modifications and alterations are included insofar as they come within the scope of the appended claims or equivalents thereof.

What is claimed is:

1. A method of halftoning an image, the method comprising:
   receiving a pixel value from the image;
   selecting a diffusion mask encompassing neighboring pixels;
   selecting a halftoning threshold;
   comparing the pixel value to the selected halftone threshold to make a marking decision;
   calculating an error value based on the pixel value and the marking decision, and
   diffusing error to at least one selected neighboring pixel within the diffusion mask based on the calculated error value, the selection of the at least one neighboring pixel within the diffusion mask being based on pixel values of a plurality of neighboring pixels within the diffusion mask.

2. The method of halftoning an image of claim 1 wherein diffusing error to at least one neighboring pixel within the diffusion mask based on the calculated error value and pixel values of a plurality of neighboring pixels within the diffusion mask comprises:
   sorting the neighboring pixels within the diffusion mask according to pixel values of the neighboring pixels to determine a pixel ranking ranging from a pixel having a highest pixel value to a pixel having a lowest pixel value;
   selectively transferring any positive error from the calculated error value to the pixel having the highest pixel value until one of: the pixel having the highest pixel value has a maximum pixel value, and, the calculated error value has been completely transferred;
   selectively transferring any remaining positive error from the calculated error value to the pixel having the second highest pixel value until one of: the pixel having the second highest pixel has the maximum pixel value, and, the calculated error value has been completely transferred;
   transferring still remaining positive error from the calculated error value to successively lower ranked pixels, proceeding to the next pixel when the current pixel reaches the maximum pixel value, until one of: all the error from the calculated error value has been distributed, and, all the neighboring pixels in the diffusion mask are at the maximum pixel value;
   selectively transferring any negative error from the calculated error value to the pixel having the lowest pixel value until one of: the pixel having the lowest pixel value has a minimum pixel value, and, the calculated error value has been completely transferred;
   selectively transferring any remaining negative error from the calculated error value to the pixel having the second lowest pixel value until one of: the pixel having the second lowest pixel value has a minimum pixel value, and, the calculated error value has been completely transferred, and
   transferring still remaining positive error from the calculated error value to successively higher ranked pixels, proceeding to the next pixel if and when the current pixel reaches a minimum pixel value, until one of: all the error from the calculated error value has been distributed, and, all the neighboring pixels in the diffusion mask are at a minimum value.

3. The method of halftoning an image of claim 1 wherein diffusing error to at least one neighboring pixel within the diffusion mask based on the calculated error value and pixel values of a plurality of neighboring pixels within the diffusion mask comprises:
   sorting the neighboring pixels within the diffusion mask according to pixel values of the neighboring pixels to determine a pixel ranking ranging from a pixel having a highest pixel value to a pixel having a lowest pixel value;
   selectively transferring all positive error from the calculated error value to the pixel having the highest pixel value;
   selectively transferring all negative error from the calculated error value to the pixel having the lowest pixel value.

4. The method of halftoning an image of claim 1 wherein diffusing error to at least one neighboring pixel within the diffusion mask based on the calculated error value and pixel values of a plurality of neighboring pixels within the diffusion mask comprises:
   sorting the neighboring pixels within the diffusion mask according to pixel values of the neighboring pixels to determine a pixel ranking ranging from a pixel having a highest pixel value to a pixel having a lowest pixel value;
   assigning positive error distribution weights to a plurality of the neighboring pixels within the distribution mask based on the sorted ranking of the pixels;
   selectively distributing positive error based on the calculated error value, to the plurality pixels according to the assigned distribution weights of the pixels;
   assigning negative error distribution weights to a plurality of the neighboring pixels within the distribution mask based on the sorted ranking of the pixels, and
   selectively transferring any negative error based on the calculated error value, to the plurality pixels according to the assigned distribution weights of the pixels.

5. The method of halftoning an image of claim 1 wherein diffusing error to at least one neighboring pixel within the diffusion mask based on the calculated error value and pixel values of a plurality of neighboring pixels within the diffusion mask comprises:
   sorting the neighboring pixels within the diffusion mask according to pixel values of the neighboring pixels to determine a pixel ranking ranging from a pixel having a highest pixel value to a pixel having a lowest pixel value;
   assigning positive error distribution weights to a plurality of the neighboring pixels within the distribution mask based on the sorted ranking of the pixels;
   selectively distributing positive error based on the calculated error value to the plurality pixels according to the assigned distribution weights of the pixels as limited by a maximum pixel value;
   assigning negative error distribution weights to a plurality of the neighboring pixels within the distribution mask based on the sorted ranking of the pixels, and
   selectively distributing negative error based on the calculated error value, to the plurality pixels according to the assigned distribution weights of the pixels as limited by a minimum pixel value.

6. The method of halftoning an image of claim 1 wherein diffusing error to at least one neighboring pixel within the diffusion mask based on the calculated error value and pixel values of a plurality of neighboring pixels within the diffusion mask comprises:
   sorting the neighboring pixels within the diffusion mask according to a combination of pixel values of the neighboring pixels and spatial weights to determine a pixel ranking ranging from a pixel having a highest pixel rank to a pixel having a lowest pixel rank;

assigning positive error distribution weights to a plurality of the neighboring pixels within the distribution mask based on the sorted ranking of the pixels;

selectively distributing positive error based on the calculated error value, to the plurality of pixels according to the assigned distribution weights of the pixels;

assigning negative error distribution weights to a plurality of the neighboring pixels within the distribution mask based on the sorted ranking of the pixels, and selectively distributing negative error based on the calculated error value, to the plurality of pixels according to the assigned distribution weights of the pixels.

7. The method of halftoning an image of claim 1 wherein calculating an error value based on the pixel value and the marking decision comprises:

determining a sign and a magnitude of a difference between the pixel value and a value associated with the marking decision;

selecting an error magnitude limit;

setting the error value to have the magnitude of the lower of the magnitude of the difference between the pixel value and the value associated with the marking decision and the error magnitude limit;

setting the sign of the error value to be the sign of the difference between the pixel value and the value associated with the marking decision.

8. A method of preparing a renderable version of an image for rendering on a device having a reduced number of quantization levels as compared to an available version of the image, the method comprising:

selecting a processing path for processing the available version of the image;

selecting at least one diffusion mask based on a compatibility with the selected processing path;

selecting a pixel of interest from the original image based on the selected processing path;

selecting a set of neighboring pixels based on the selected pixel of interest and the selected diffusion mask;

making a marking decision based on a pixel value of the pixel of interest; calculating an error value based on the marking decision;

ranking the neighboring pixels according to pixel values of the neighboring pixels; and, diffusing error, based on the calculated error value, to at least one neighboring pixel based on the ranking of the neighboring pixels.

9. The method of preparing a renderable version of an image of claim 8 wherein selecting a processing path comprises selecting one of a Hilbert curve, a Peano curve, a side to side raster curve, and a serpentine raster curve.

10. The method of preparing a renderable version of an image of claim 8 wherein ranking the neighboring pixels according to pixel values further comprises ranking the neighboring pixel according to a combination of pixel values and a measure of neighboring pixel positions.

11. The method of preparing a renderable version of an image of claim 8 wherein diffusing error comprises modifying at least one threshold value associated with the at least one neighboring pixel.

12. The method of preparing a renderable version of an image of claim 8 wherein diffusing error comprises modifying at least one pixel value associated with the at least one neighboring pixel.

13. An image processing system operative to perform rank order error diffusion, the image processing system comprising:

a pixel ranker operative to receive information about a set of selected neighboring pixels, and assign a rank to the selected neighboring pixels based on pixel values of the neighboring pixels;

a thresholder operative to compare a pixel value of a pixel of interest to a threshold value to generate a comparison result;

a marker operative to make a marking decision based on the comparison result; and, an error diffuser operative to calculate an error value base on the pixel value of the pixel of interest and the marking decision, and to modify a value of at least one of the selected neighboring pixels, based on the ranking of the selected neighboring pixel and the calculated error value.

14. The image processing system operative to perform rank order error diffusion of claim 13 further comprising a pixel and neighborhood selector operative to select a processing path for processing an image, select at least one diffusion mask for defining a neighborhood of pixels associated with a pixel of interest, select the pixel of interest based on the selected processing path, select neighboring pixels based on the selected pixel of interest and the selected diffusion mask, and deliver information about the pixel of interest and the selected neighboring pixels to the pixel ranker.

15. The image processing system operative to perform rank order error diffusion of claim 13 further comprising:

a rendering device operative to render an image based on a plurality of rendering decisions received from the marker.

16. The image processing system operative to perform rank order error diffusion of claim 15 wherein the rendering device comprises a xerographic printer.

17. The image processing system operative to perform rank order error diffusion of claim 13 wherein the pixel ranker is operative to assign the rank to the selected neighboring pixels based on pixel values of the neighboring pixels and a measure of a spatial position of the at least one neighboring pixel.

18. The image processing system operative to perform rank order error diffusion of claim 17 wherein the measure of the spatial position of the at least one neighboring pixel is a measure of spatial position relative to the pixel of interest.

19. The image processing system operative to perform rank order error diffusion of claim 17 wherein the measure of the spatial position of the at least one neighboring pixel is a measure of spatial position relative to a portion of a related halftone screen.

* * * * *